United States Patent [19]
Amati et al.

[11] Patent Number: 4,916,178
[45] Date of Patent: Apr. 10, 1990

[54] STABLE SOLUTIONS OF POLY-α-HYDROXYACRYLIC ACID SALTS

[75] Inventors: Werner Amati, Hersberg; José Canela, Therwil, both of Switzerland

[73] Assignee: Sandoz Ltd., Basel, Switzerland

[21] Appl. No.: 263,666

[22] Filed: Oct. 27, 1988

Related U.S. Application Data

[63] Continuation of Ser. No. 68,461, Jun. 30, 1987.

[51] Int. Cl.$^4$ .................. C08F 8/26; C08F 120/04; D06L 3/02; D21C 9/16
[52] U.S. Cl. .................... 524/401; 524/456; 524/558; 526/229; 526/240; 526/292.95; 526/318.3
[58] Field of Search .............. 524/401, 456, 558; 526/292.95, 229, 240, 318.3

[56] References Cited

U.S. PATENT DOCUMENTS

| | | | |
|---|---|---|---|
| 3,740,187 | 6/1973 | Kowalski | 8/111 |
| 3,984,439 | 10/1976 | Van Leutem et al. | 526/292.95 |
| 3,994,969 | 11/1976 | Van Leutem et al. | 525/384 |
| 4,079,016 | 3/1978 | Brahm et al. | 526/320 |
| 4,107,411 | 8/1978 | Mulders et al. | 526/75 |
| 4,182,806 | 1/1980 | Van Leutem et al. | 525/369 |
| 4,363,699 | 12/1982 | De Ceuster et al. | 8/107 |

FOREIGN PATENT DOCUMENTS

| | | |
|---|---|---|
| 1328749 | 8/1973 | United Kingdom . |
| 1524013 | 9/1978 | United Kingdom . |
| 1557760 | 12/1979 | United Kingdom . |

*Primary Examiner*—Herbert J. Lilling
*Attorney, Agent, or Firm*—Gerald D. Sharkin; Richard E. Vila; Thomas C. Doyle

[57] ABSTRACT

The invention relates to the stabilization of alkaline solutions of peroxide bleaching compounds using, as stabilizing agent, a water-soluble poly-α-hydroxyacrylic acid salt which in the sodium salt form has an average molecular weight Mw from 2000 to 10,000 and to the preparation of such a salt.

26 Claims, No Drawings

STABLE SOLUTIONS OF POLY-α-HYDROXYACRYLIC ACID SALTS

This is a continuation of application Ser. No. 07/068,461, filed June 30, 1987.

The present invention relates to the stabilization of alkaline solutions of peroxide bleaching compounds as used e.g. for the bleaching of textiles and paper pulps.

It is known to stabilize peroxide bleaching compounds, particularly hydrogen peroxide, when used in an alkaline bleaching bath by the addition of a poly-α-hydroxyacrylic acid salt. For bleaching with peroxide compounds, particularly in continuous bleaching processes, it is highly desirable to use stock solutions containing the essential components of the bleaching bath. These stock solutions contain a high concentration of an alkali, the peroxide stabilizer and optionally the peroxide compound and further ingredients such as a surfactant and a water softening agent. The poly-α-hydroxyacrylic acids generally proposed as stabilizing agents are polymers having a molecular weight significantly higher than 10,000. When added to a concentrated alkaline solution, e.g. a stock solution as used for a peroxide bleaching bath, particularly a solution having an alkaline concentration >10°Bé, these polymers tend to instability and lose their property of stabilizing the peroxide bleaching agent.

It has now been found that poly-α-hydroxyacrylic acids having a low molecular weight are surprisingly stable in a highly concentrated alkaline solution without their property of stabilizing peroxide bleaching compounds being impaired.

Accordingly there is provided a process for bleaching a cellulosic fibrous material with a peroxide compound in an aqueous alkaline medium, comprising using as a stabilizing agent (a) a water-soluble salt of a poly-α-hydroxyacrylic acid, the sodium salt thereof having an average molecular weight Mw from 2000 to 10,000.

Suitable water-soluble salts include alkali metal salts, preferably sodium and potassium, and ammonium salts. Preferably the poly-α-hydroxyacrylic acid is used in a water soluble salt form having the same cation as the alkaline medium, the sodium salt being most preferred.

Preferred poly-α-hydroxyacrylic acids and salts are those which in the form of the sodium salt have an average molecular weight Mw from 3000 to 10,000, more preferably 4000 to 8000. By average is meant an average in the weight. The molecular weight of these polymers may be measured according to known methods, e.g. by means of gel permeation chromatography. The molecular weights indicated above are as determined by gel permeation chromatography using a 10% aqueous solution of sodium poly-α-hydroxyacrylate at a pH of 6.5-7. Preferably the sodium poly-α-hydroxyacrylate is obtained by hydrolysis of the corresponding polylactone with a buffer salt having a buffering action at pH 6.5 to 7.5, particularly a phosphate buffer.

The stabilizing agent of the invention can be used in the form of poly-α-hydroxyacrylic acid, poly-α-hydroxyacrylic acid salt or the corresponding polylactone. In the latter case, when the polylactone comes into contact with an alkaline medium, it is converted into the corresponding poly-α-hydroxyacrylic acid salt. The poly-α-hydroxy-acrylic salts may be used in dry form or as an aqueous solution, particularly as a concentrated aqueous solution, e.g. a solution having a dry content of from 4 to 30% by weight.

The poly-α-hydroxyacrylic acids and their salts may be produced according to known methods, e.g. by oxidative depolymerization of poly-α-hydroxyacrylic acids or poly-αhydroxyacrylates having a high molecular weight, e.g. as disclosed in the German patent applications DOS 28 00 920 and 28 18 089. The poly-α-hydroxyacrylic acids and their salts may also be obtained from the corresponding polylactones by reaction with an aqueous base.

The polylactones which after hydrolysis to the sodium salt form have a molecular weight from 2000 to 10,000 and the process for their production form also part of the invention. The polylactones may be prepared by polymerization of α-chloroacrylic acid in an aqueous acidic medium.

The concentration of the α-chloroacrylic acid in the aqueous reaction medium may advantageously be from 5 to 70% by weight, preferably from 5 to 40% by weight. Polymerization is conveniently carried out at a temperature within the range of 40°-150° C., preferably 60°-98° C., more preferably 70°-90° C., advantageously in the presence of a polymerization catalyst. Suitable catalysts are for example water-soluble azo-bis-compounds such as 4,4'-azo-bis-(4-cyanopentanoic acid) or 2,2'-azo-bis-(2-aminodipropane) dihydrochloride; a peroxy compound such as benzoyl hydroperoxide, cumene hydroperoxide, dibenzoyl peroxide, sodium perborate, hydrogen peroxide or potassium or ammonium peroxydisulphate. Preferred polymerisation catalysts are the peroxy compounds, particularly potassium and ammonium peroxydisulphate and hydrogen peroxide, the latter being especially preferred. Hydrogen peroxide may be added as such to the reaction medium or used as hydrogen peroxide-yielding compound, e.g. potassium peroxide. Preferably hydrogen peroxide is added directly to the reaction medium.

It may also be advantageous to carry out the polymerization in the presence of a chain transfer agent, e.g. a thiol compound such as mercaptoethanol, thiophenol or ethyl thioglycolate. Preferably, however, the polymerization is carried out in the absence of a chain transfer agent. To regulate the molecular weight within the desired range e.g. to keep it low, it is preferred to vary reaction parameters, for example the temperature or the amount of catalyst.

Hydrogen peroxide is advantageously used in an amount of from 3.5 to 11 g, preferably 7-10 g per mole of α-chloroacrylic acid. When the catalyst is a peroxy compound of a higher molecular weight than hydrogen peroxide, it is used in a corresponding amount.

Polymerization is conveniently carried out at a pH value between 1 and 5. The reaction mixture may be acidified with an inorganic or organic acid, for example sulphuric, hydrochloric or phosphoric acid or an aromatic sulphonic acid such as p-toluene sulphonic acid. Hydrochloric acid is preferred.

The reaction steps to give the polymeric compound comprise a polymerization step to poly-α-chloroacrylic acid (optionally partially in the salt form when the α-chloroacrylic acid is used for example in an alkali metal salt form), the hydrolysis of the chlorine located in the α-position to the carboxylic acid and lactonization. Lactonization may be partial or full. The resulting polylactone is insoluble in water and is present as a solid in the aqueous reaction medium. It may be isolated and purified by any known method, e.g. filtration or centrifuging. If desired, the polylactone may be converted into the corresponding poly-α-hydroxyacrylic acid salts by reaction with an aqueous base, e.g. an alkali metal hydroxide, e.g. lithium, sodium or potassium hydroxide, ammonium hydroxide or an amine, e.g. a mono-, di- or tri-$C_{1-4}$alkyl or -$C_{2-4}$alkanolamine, particularly tri($C_{2-3}$alkanol)amine, or a buffer salt derived from such a base and having a buffering action at pH 6 to 8 preferably at pH 6.5 to 7.5, the alkali metal hydroxides, especially sodium hydroxide, being preferred. The poly-$\alpha$-hydroxyacrylic acid salts may also be obtained directly without any intermediary isolation of the polylactone, by addition of an aqueous base to the polylactone-containing reaction mixture.

The bleaching process of the invention is suitable for the bleaching of various types of cellulosic fibrous substrates with a peroxide bleaching compound. Suitable peroxide compounds are water-soluble peroxides, particularly alkali metal peroxides, preferably sodium peroxide, and hydrogen peroxide, the latter being particularly preferred. The peroxide bleaching is carried out in an alkaline medium; to achieve the alkaline conditions, it is advantageous to use an alkali metal hydroxide, preferably potassium or sodium hydroxide, sodium hydroxide being most preferred.

Suitable cellulosic fibrous substrates include paper pulps, for example mechanical pulps, chemical and semi-chemical pulps, mechanical-chemical pulps or thermomechanical pulps and textile fibres comprising natural cellulosic fibres, e.g. cotton, linen, jute, ramie, hemp or sisal fibres, and/or regenerated cellulosic fibres such as rayon or cellulose acetate. The textile substrate can be in a variety of forms, e.g. yarn, tops, woven, knitted, plush and carpets. The bleaching of textile materials generally takes place after the desizing treatment and prior to cloth manufacturing. Waste paper pulps can also be treated according to the invention, in which case the pulp is bleached and optionally de-inked.

The bleaching temperatures for textile fibres and paper pulps can be varied within a broad range; most often they are between 20°–180° C., preferably between 40°–105° C. The amount of peroxide bleaching compound may vary within a broad range depending on the nature of the substrate and the bleaching process used. In general, the peroxide bleaching compound (particularly hydrogen peroxide) is used in an amount of from 0.1 to 50% by weight, based on the dry weight of the substrate. When hydrogen peroxide is used as peroxide bleaching compound, it is advantageously employed in an amount from 0.2 to 10%, preferably 0.5 to 5% by weight based on the dry weight of the substrate.

The bleaching process of the invention may be carried out in any apparatus suitable for a continuous, semi-continuous or discontinuous treatment, e.g. by exhaustion, impregnation or padding in the case of a textile material, paper pulps being treated as such or after they have been brought into sheet form. Bleaching by exhaustion or impregnation of textile materials or bleaching of paper pulps or pulp sheet can be effected according to known methods. For example, when textile materials are bleached by impregnation, the impregnated textile substrate can either be cold dwell or heat treated, e.g. at a temperature of from 90° to 120° C., preferably 95°–105° C.

According to the invention, the stabilizing agent (a) is conveniently used in an amount from 0.5 to 40, preferably 1 to 35, particularly 1 to 30 parts by weight (calculated as sodium salt) based on 100 parts by weight of peroxide bleaching compound, particularly 100 parts by weight of hydrogen peroxide.

In a preferred embodiment of the invention, the bleaching of the cellulosic substrate is carried out using a concentrated solution of the components of the bleaching bath such as a stock solution or reinforcing bath. In the following, these concentrated solutions are referred to as the stock solutions. Such reinforcing baths or stock solutions also form part of the invention. Suitable stock solutions (including reinforcing baths) are those comprising (a) a poly-$\alpha$-hydroxyacrylic acid in a water-soluble salt form as defined above
(b) an alkali metal hydroxide, and
(c) water.

The stock solutions of the invention advantageously contain the stabilizing agent (a) in a concentration of from 1 to 50 g/l, preferably 1.4 to 35 g/l (calculated as sodium salt). The alkali metal hydroxide (b) which is preferably KOH or NaOH, especially sodium hydroxide, is conveniently present in a concentration of from 70 to 300 g/l, preferably 80 to 200 g/l. More preferably the concentration of component (b) is from 10 to 20° Bé.

It is advantageous to adjust the hardness of the bleaching bath by adding to the stock solution of the invention (d) a water soluble calcium or magnesium salt.

Advantageously component (d) is added to the stock solution in an amount such as to adjust the water hardness of the bleaching bath to 3°–10° dH, preferably 4°–8° dH. Preferred components (d) are magnesium or calcium chloride.

The stock solution of the invention may advantageously contain further assistants. In addition to components (a), (b), (c) and optionally (d), it may contain (e) a surfactant.

Advantageously component (e) is a surfactant having wetting properties, e.g. capable of rapidly wetting a dry textile substrate, and/or detergent properties, e.g. when washing is simultaneously desired with the bleaching of textile material or when waste paper is de-inked. Preferably the surfactants (e) are anionic or amphoteric. Preferred anionic surfactants are those whose molecule contains at least one lipophilic residue, preferably an aliphatic or araliphatic hydrocarbon residue having 10 to 24 carbon atoms, and at least one residue having a marked anionic character, e.g. a sulphate, sulphonate, phosphoric acid ester, phosphonate or carboxylate group. Such anionic surfactants may contain additional groups such as alkyleneoxy groups, preferably ethyleneoxy and propyleneoxy groups, for example 1 to 30 ethyleneoxy units. Examples of anionic surfactants are soaps and carboxymethylated non-ionic surfactants. Preferred amphoteric surfactants are acid modified amines.

The concentration of component (e) in the stock solution may vary depending on the bleaching method used. In general component (e), when present, is added to the stock solution in an amount of from 0.1 to 10 g/l.

The stock solutions of the invention may also contain further additives such as optical brighteners, softening agents, antistatic agents etc.

Further, the stock solution of the invention may contain (f) a peroxide bleaching compound.

Component (f) may be added to the stock solution at the beginning or just prior to the addition to the treatment bath.

The peroxide bleaching compound may also be added directly to the treatment bath, simultaneously with or independently from the stock solution.

The stock solutions of the invention may be prepared according to known methods, e.g. readily by mixing the various components. The stock solution may be diluted with water to give the bleaching bath. When used as reinforcing bath it may be added directly to the bleaching bath. The stock solution may only contain components (a), (b) and (c). The remaining components (d) and/or (e) and/or (f), if desired, may be added directly to the bleaching bath or the paper pulp to be bleached.

The process of the invention is particularly suitable for bleaching a cellulosic fibrous substrate in accordance with a continuous or semi-continuous method using a stock solution or reinforcing bath as disclosed above. The stock solution may be added portionwise to or metered in the bleaching bath or the paper pulp at such a ratio that the composition and optionally the level of the bleaching bath are kept constant. If necessary, additional water may be added.

The poly-α-hydroxyacrylates used in the process of the invention are effective stabilizing agents of peroxide bleaching compounds and allow to reach an optimal bleaching effect even in the absence of other sequestering assistants. The poly-α-hydroxy-acrylates having a molecular weight within the range indicated exhibit a good stability in an alkaline medium, particularly a medium having an alkali concentration >10° Bé. Stable concentrated stock solutions can be prepared which is particularly advantageous for the bleaching on an industrial scale.

The poly-α-hydroxyacrylates used in the process of the invention also exhibit a good compatibility with other sequestering assistants, which can be inorganic, e.g. borates or silicates, as well as organic, e.g. polyamines modified with acid groups such as ethylenediamine tetraacetic acid, sodium diethylenetriamine pentamethylene phosphoric acid salt, or oxyacids such as hydroxyalkylidene polyphosphoric acid derivatives, or sodium gluconate, heptonate, tartrate, citrate or heptonate.

The following Examples, in which the temperatures are in degrees Centigrade, illustrate the invention.

EXAMPLE 1

1120 g demineralized water, 175.5 g sodium chloride and 385.5 g sodium α-chloroacrylate are introduced at room temperature in a 2.5 l flask equipped with stirrer and thermometer. 180 g of a 30% hydrochloric acid solution are then added dropwise within 30 minutes at such a rate that the temperature does not exceed 40° (pH =2.5). Thereafter 75 g of 35% hydrogen peroxide are added in the course of 5 minutes, the reaction mixture is heated within one hour from 40° to 75° and stirred for three hours at 75°. After cooling to room temperature, the resulting polylactone is filtered and then washed with 9000 g demineralized water. There is obtained a beige filtration cake having a dry content of 27%. The filtration cake is dried at 110°.

EXAMPLE 2

632 g of the wet filtration cake as obtained in Example 1 are suspended with stirring in 1606 g demineralized water. 201 g of a 30% sodium hydroxide are then added dropwise within 10 minutes, the temperature rising to 30°-32°. The resulting mixture is further stirred at 30°-32° and at a pH of 6.5-7 for 50 minutes. Thereafter 7 g of 35% hydrogen peroxide are added and the mixture is stirred for 30 minutes. The resulting yellowish solution can be either evaporated to dryness, or used directly as such. The resulting sodium poly-α-hydroxyacrylate has a molecular weight of 5260 and the polydispersity Mw/Mn obtained by gel permeation chromatography (measured by using standard polyacrylic acid) is 3.17.

EXAMPLE 3

The procedure of Example 1 is repeated to the production of the polylactone suspension. The resulting polylactone suspension is not filtered but reacted directly with 450 g of a 30% sodium hydroxide solution at 50°-60°. To the resulting slightly turbid, brown red solution there is added 7 g of 35% hydrogen peroxide and the whole mixture is stirred at 60° for 30 minutes.

The resulting sodium poly-α-acrylate has a molecular weight Mw of 4865 and a polydispersity Mw/Mn of 5.41 (measured as disclosed in Example 1).

EXAMPLE 4

The procedure of Examples 1 and 2 is repeated but using 60 g of 35% hydrogen peroxide instead of 75 g as polymerization catalyst. The resulting sodium poly-α-hydroxyacrylate has a molecular weight Mw of 6200.

EXAMPLE 5

The procedure of Examples 1 and 2 is repeated but using 45 g of 35% hydrogen peroxide instead of 75 g. The resulting sodium poly-α-hydroxyacrylate has a molecular weight Mw of 7000.

EXAMPLE 6

The procedure of Examples 1 and 2 is repeated but using 30 g of 35% hydrogen peroxide instead of 75 g. The resulting sodium poly-α-hydroxyacrylate has a molecular weight Mw of 10,000.

EXAMPLE 7

75 g of a 12% hydrochloric acid solution are introduced in a 1.5 l flask and heated to 70°. From two separated dropping funnels, there added simultaneously within one hour 64 g of sodium α-chloroacrylate dissolved in 233 g water and 25 g ammonium peroxydisulphate dissolved in 35 g water. The temperature is kept constant at 70°-72°. The resulting polylactone percipitates. When the reaction is complete, the polylactone is filtered, washed with water and dried. Yield: 35 g polylactone having after hydrolysis with a sodium dihydrogeno phosphate/disodium hydrogeno phosphate buffer into the sodium salt a molecular weight Mw of 10,000.

EXAMPLE 8

The procedure of Example 7 is repeated but the temperature is kept constant at 80°-82° instead of 70°-72°. Yield: 35 g polylactone having after hydrolysis with a sodium dihydrogeno phosphate/disodium hydrogeno phosphate buffer into the sodium salt a molecular weight Mw of 6000.

EXAMPLE 9

The procedure of Example 7 is repeated but the temperature is kept constant at 90°-92° instead of 70°-72°. Yield: 34 g polylactone having after hydrolysis with a sodium dihydrogeno phosphate/disodium hydrogeno phosphate buffer into the sodium salt a molecular weight Mw of 3500.

APPLICATION EXAMPLE A (α) Preparation of the stock solution

The following stock solution is prepared by mixing:
870 g of water adjusted to 5° dH by the addition of magnesium chloride
116 g sodium hydroxide, and
14 g anhydrous polylactone as prepared in Example 1

(β) Preparation of the bleaching bath

To 836 g of water 5° dH are added in the following sequence with stirring:
4 g of a 50% aqueous composition of $C_{9-11}$ alkanol-diglycol phosphoric acid monoester sodium monosalt
30 g 35% hydrogen peroxide, and
130 g of the stock solution (α)

(γ) Pad-roll bleaching process

A desized raw cotton fabric is padded with the aqueous bleaching bath prepared in (β), and squeezed to a pick-up of 90%. The impregnated fabric is then steamed at 95° for 90 minutes and finally rinsed and dried.

APPLICATION EXAMPLE B (α) Preparation of the stock solution

The following stock solution is prepared by mixing:
684 g water 5° dH (adjusted with $MgCl_2$)
116 g sodium hydroxide, and
200 g of the solution of sodium poly-α-hydroxyacrylate of Example 3

(β) Preparation of the bleaching bath

To 781 g water 5° dH are added in the following sequence with stirring:
4 g of a 50% aqueous composition of $C_{9-11}$ alkanol-diglycol phosphoric acid monoester sodium monosalt
40 g 35% hydrogen peroxide
175 g of the stock solution (α) above (γ) Pad-steam bleaching process A desized raw cotton fabric is padded with the aqueous bleaching bath prepared in (α) above, squeezed to a pick-up of 90% and steam treated at 102° for 20 minutes. The bleached fabric is then rinsed and dried.

APPLICATION EXAMPLE C (α) Preparation of the stock solution

To 895 g water 5° dH (adjusted with $MgCl_2$) are added
84 g sodium hydroxide
10 g anhydrous polylactone of Example 1, and
11 g of a 50% aqueous composition of $C_{9-11}$ alkanol-di-glycol phosphoric acid monoester sodium monosalt (β) Preparation of the bleaching bath To 790 g water 5° dH are added
180 g of the stock solution (α), and
30 g 35% hydrogen peroxide (γ) Bleaching is carried out as disclosed in Application Example A (γ).

APPLICATION EXAMPLE D

Bleaching and de-inking of waste paper
6 kg of paper pulp containing
135.00 g waste paper from newspapers and magazines
0.54 g of a 5% solution of sodium poly-α-hydroxyacrylate according to Example 2
2.16 g sodium hydroxide
1.35 g sodium tallow fatty acid salt
the remaining being water is treated for 20 minutes in a pulper while the temperature is raised to 60°-65° and left to dwell for 20 minutes at the same temperature. Thereafter the mixture is diluted to a total volume of 15 liters and further dwelt for 20 minutes. The pulp is maintained in flotation for 15 minutes at a pH of 8-9, acidified to pH 5 by the addition of hydrochloric acid and then flowed into the sheet former. The sheets are pressed and dried at 90°-100° for 20 minutes. The resulting paper sheets exhibit a good whiteness.

In the above procedure, the sodium hydroxide and sodium poly-α-hydroxyacrylate are added to the paper pulp in the form of a stock solution containing 30 g/l of the 5% solution of sodium poly-α-hydroxyacrylate and 120 g/l sodium hydroxide.

APPLICATION EXAMPLE E

Bleaching of mechanical paper pulp
800 g of a pulp containing
40.00 g of dry non bleached thermomechanical paper pulp from pine wood
0.02 g sodium poly-α-hydroxyacrylate of Example 2
1.20 g 30% sodium hydroxide solution
1.20 g 35% hydrogen peroxide, completed with water and having a pH of 10.2 is continuously stirred for 2 hours and a half at 60°. After cooling to room temperature, the pulp is adjusted to a pH of 4.5 by the addition of hydrochloric acid. Sheets are then formed from this pulp, pressed and dried at 90°-100° for 20 minutes. The resulting paper sheets exhibit a good whiteness.

In the above procedure, the sodium hydroxide and sodium poly-α-hydroxyacrylate are added to the paper pulp in the form of a stock solution containing 90 g/l sodium hydroxide and 2 g/l of the sodium poly-α-hydroxyacrylate.

APPLICATION EXAMPLE F

The procedure of Example E is repeated except that 2 g/l hexa sodium diethylene-triamine pentamethylene phosphoric acid salt are added to the stock solution. The resulting pulp contains 0.02 g of the hexa sodium salt.

By replacing in the Application Examples A to F the poly-α-hydroxyacrylates by one of the further poly-α-hydroxyacrylates obtained in Examples 1 to 9, stable stock solutions can be prepared which induce a good bleaching effect when used for alkaline peroxide bleaching.

What is claimed is:
1. A stock solution comprising
  (a) a water-soluble salt of a poly-α-hydroxyacrylic acid, the sodium salt thereof having an average molecular weight Mw from 2000 to 10,000;
  (b) from 70 to 300 g/l of an alkali metal hydroxide, and
  (c) water.

2. A stock solution according to claim 1 containing from 1 to 50 g/l of component (a).

3. A stock solution according to claim 1 containing in addition to (a), (b) and (c)
   (d) a water-soluble calcium or magnesium salt, or
   (e) a surfactant
   or a combination of (d) and (e).

4. A stock solution according to claim 1 containing in addition to (a), (b) and (c)
   (d) a water-soluble calcium or magnesium salt, or
   (e) a surfactant, or
   (f) a peroxide bleaching compound,
   or any combination of components (d), (f) and (e).

5. A stock solution according to claim 1 wherein component (a) is a water-soluble salt of a poly-$\alpha$-hydroxyacrylic acid whose sodium salt has an average molecular weight from 4,000 to 8,000.

6. A stock solution according to claim 1 wherein the concentration of component (b) is from 10° to 20° Bé.

7. A stock solution according to claim 1 containing from 80 to 200 g/l of an alkali metal hydroxide (b).

8. A stock solution according to claim 5 wherein the concentration of component (b) is from 10° to 20° Bé.

9. A stock solution according to claim 2 wherein component (b) is sodium hydroxide.

10. A stock solution according to claim 8 wherein component (b) is sodium hydroxide.

11. A stock solution according to claim 1 containing (d) a water-soluble calcium or magnesium salt in an amount sufficient to adjust the water hardness of a bleaching bath to 3°–10° dH.

12. A stock solution according to claim 3 containing component (d) in an amount sufficient to adjust the water hardness of a bleaching bath to 3°–10° dH.

13. A stock solution according to claim 2 containing (d) a water-soluble calcium or magnesium salt in an amount sufficient to adjust the water hardness of a bleaching bath to 3°–10° dH.

14. A stock solution according to claim 13 wherein component (d) is magnesium or calcium chloride.

15. A process for the production of polylactones which comprises polymerizing $\alpha$-chloroacrylic acid in an aqueous acidic medium in the presence of a peroxy compound as polymerization catalyst, so as to produce polylactones whose corresponding sodium poly-$\alpha$-hydroxyacrylates have an average molecular weight Mw in the range 2,000 to 10,000, said peroxy compound, when it is hydrogen peroxide, being used in an amount of from 3.5 to 11 grams per mole of $\alpha$-chloroacrylic acid and, when it is a compound of higher molecular weight than hydrogen peroxide, being used in a corresponding amount.

16. A process according to claim 15 wherein the polymerization is effected at a temperature in the range 40°–150° C. and a pH between 1 and 5.

17. A process according to claim 16 wherein the concentration of $\alpha$-chloroacrylic acid in the aqueous acidic medium is from 5 to 70% by weight.

18. A process according to claim 16 wherein the peroxy compound is selected from the group consisting of benzoyl hydroperoxide, cumene hydroperoxide, dibenzoyl peroxide, sodium perborate, potassium peroxydisulfate, ammonium peroxydisulfate and hydrogen peroxide.

19. A process according to claim 16 wherein the peroxy compound is hydrogen peroxide.

20. A process according to claim 16 wherein the polymerization is effected at a temperature in the range 60°–98° C.

21. A process according to claim 18 wherein the polymerization is effected at a temperature in the range 60°–98° C.

22. A process according to claim 18 wherein the peroxy compound, when it is hydrogen peroxide, is present in an amount of from 7 to 10 grams per mole of $\alpha$-chloroacrylic acid and, when it is a compound of higher molecular weight than hydrogen peroxide, is present in a corresponding amount.

23. A process according to claim 22 wherein the peroxy compound is potassium peroxydisulfate, ammonium peroxydisulfate or hydrogen peroxide.

24. A process according to claim 23 wherein the peroxy compound is hydrogen peroxide.

25. A process according to claim 23 wherein the polymerization is effected at a temperature in the range 60°–98° C.

26. A process according to claim 25, wherein the peroxy compound is hydrogen peroxide.

* * * * *